Sept. 15, 1959 G. E. MARYGOLD 2,904,294
CLAMP DEVICE
Filed Feb. 11, 1957 3 Sheets-Sheet 1
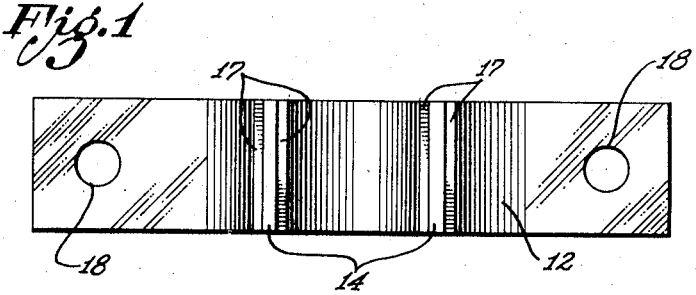
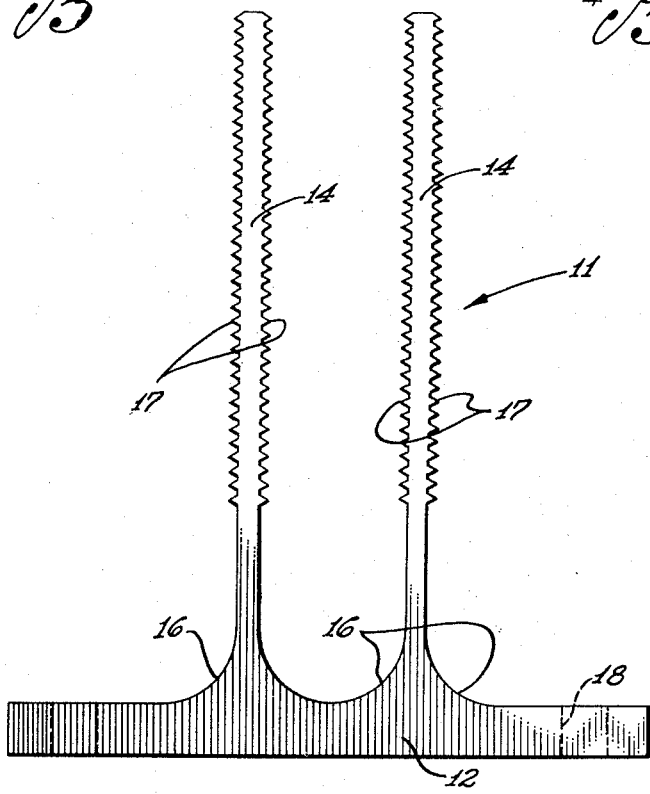
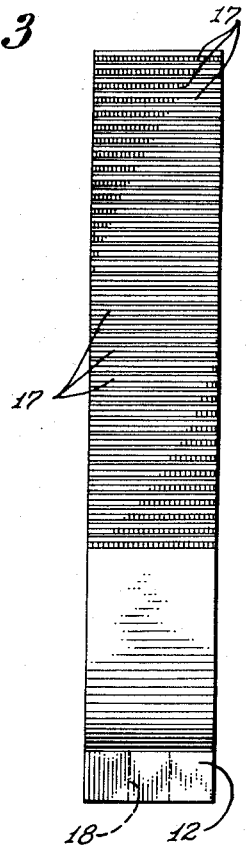
INVENTOR:
George E. Marygold
By Herbert E. Metcalf
His Patent Attorney Sept. 15, 1959 G. E. MARYGOLD 2,904,294
CLAMP DEVICE
Filed Feb. 11, 1957 3 Sheets-Sheet 2

INVENTOR:
George E. Marygold
By Hubert E. Metcalf
His Patent Attorney

Sept. 15, 1959  G. E. MARYGOLD  2,904,294
CLAMP DEVICE

Filed Feb. 11, 1957  3 Sheets-Sheet 3

INVENTOR:
George E. Marygold
By Herbert E. Metcalf
His Patent Attorney

# United States Patent Office 2,904,294
Patented Sept. 15, 1959

2,904,294

CLAMP DEVICE

George E. Marygold, Van Nuys, Calif., assignor, by mesne assignments, to Northrop Corporation, a corporation of California Application February 11, 1957, Serial No. 639,335

3 Claims. (Cl. 248—74)

This invention relates to clamp facilities and more particularly to a clamping device adapted to support and maintain a plurality of electrical wires, cables, fluid conduits and the like which constitute a particular installation in a predetermined relative relationship.

In many installations in which electrical wires, fluid conduits, etc. of various sizes are to be secured and supported in a predetermined relationship a clamping device having flexible characteristics is highly desirable. The above statement is especially true in connection with clamping installations in aircraft and similar structures in which a high degree of vibration occurs. If a clamping device of the above type is to have maximum utility it not only should be able to receive and embrace a plurality of elongated members of various sizes, that is a plurality of members of different sizes that fall within a predetermined range, but its lengthwise extent should also be a variable. Although the lengthwise extent of the final clamping device as disclosed herein cannot be varied it consists of a length cut from an extrusion or the like and in this sense the lengthwise extent thereof may be varied in a manner that will be apparent presently.

Accordingly one object of the present invention is to provide a clamping device of a type that is adjustable to receive and embrace a plurality of elongated members of different sizes that fall within a predetermined range.

Another object is to provide a clamping device constructed in its entirety of a plastic material or the like and therefore does not present sharp corners which may wear insulation from electrical conductors and the like or which may result in other and similar damage to the members supported thereby.

Another object is to provide a clamping device which constitutes a portion of an extrusion or the like and in this sense its width or extent may be varied.

Another object is to provide a clamping device which is characterized by having a high degree of flexibility complemented by a high degree of strength and which is economical to manufacture.

Although the characteristic features of the present invention are particularly pointed out in the appended claims, the invention itself, also the manner in which it may be carried out, will be better understood by referring to the following description taken in connection with the accompanying drawings forming a part of this application and in which:

Figures 1, 2 and 3 are plan, front and side views, respectively, of the clamping device as disclosed herein.

Figure 4:
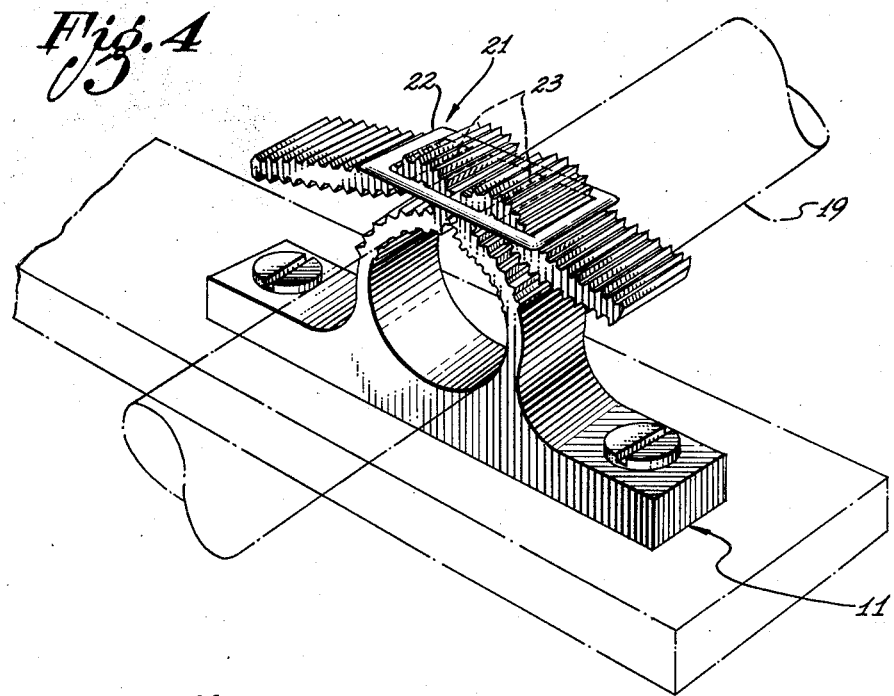
Figure 4 is a perspective view of a typical installation employing the clamping device as shown in Figures 1, 2 and 3 and in which a clip or buckle is utilized to complete the installation.

Referring now to the drawing, Figures 1–3 show the general concept of a clamping device 11 of the type as disclosed herein. The device 11 consists primarily of a base portion 12 and a pair of arms 14—14, the latter members extending from the base portion 12.

The clamping device 11 constitutes a partial length of an extrusion or the like and, therefore, is of integral construction. The base portion 12 is of strap-like configuration and is rectangular in plan although this need not necessarily be the case. The arms 14—14 are also of strap-like configuration and extend at right angles from one side surface of the base portion 12 in parallel relationship thereto substantially as shown in Figure 2. It will be seen that the arms 14 are located respectively equal distances on each side of the midpoint of the base portion when the latter is considered lengthwise. It will also be seen that the terminal ends of the arms 14, that is the ends of the arms adjacent the base portion 12, terminate in cylindrical surfaces 16 which are faired into the upper surface of the base portion.

The device 11 is normally constructed of a nylon, Teflon, plastic or like material. In view of the material from which the device 11 is constructed, and in view of the fact that the arms 14 are fairly thin, they are inherently rendered quite flexible and resilient. In fact the arms so constructed may be folded back on themselves without damage thereto and when released will assume their original attitude. In this respect it will be seen that the base portion 12 is considerably thicker than the arms 14 and therefore inherently is more rigid than the arms 14 and will provide suitable means for attaching the clamping device to supporting structure.

Figure 6:
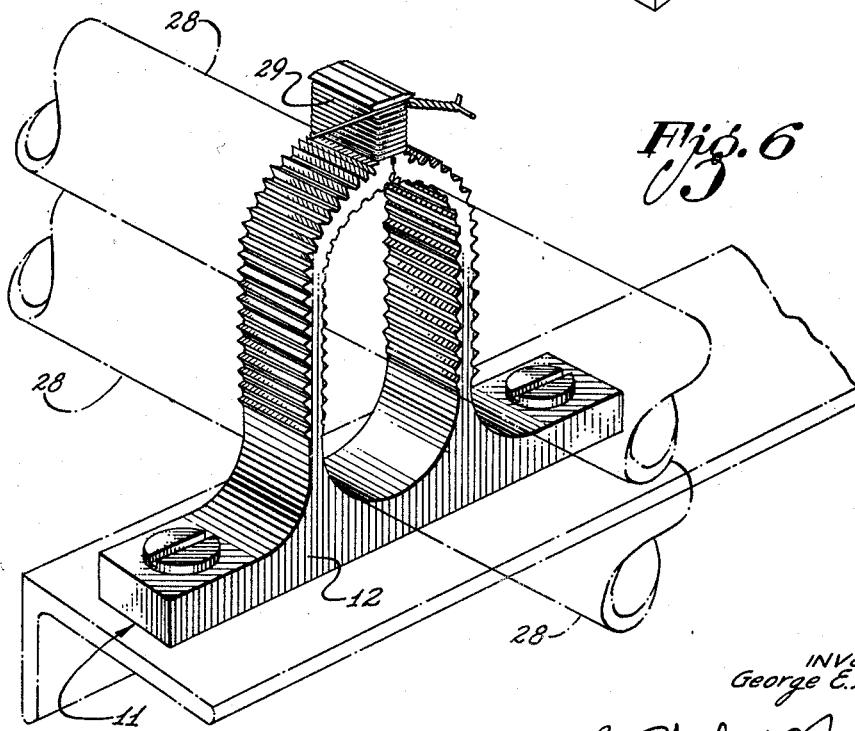
Figures 5 and 6 are views similar to Figure 4 but in which different retainer means are utilized to complete the installations.
Figure 5:
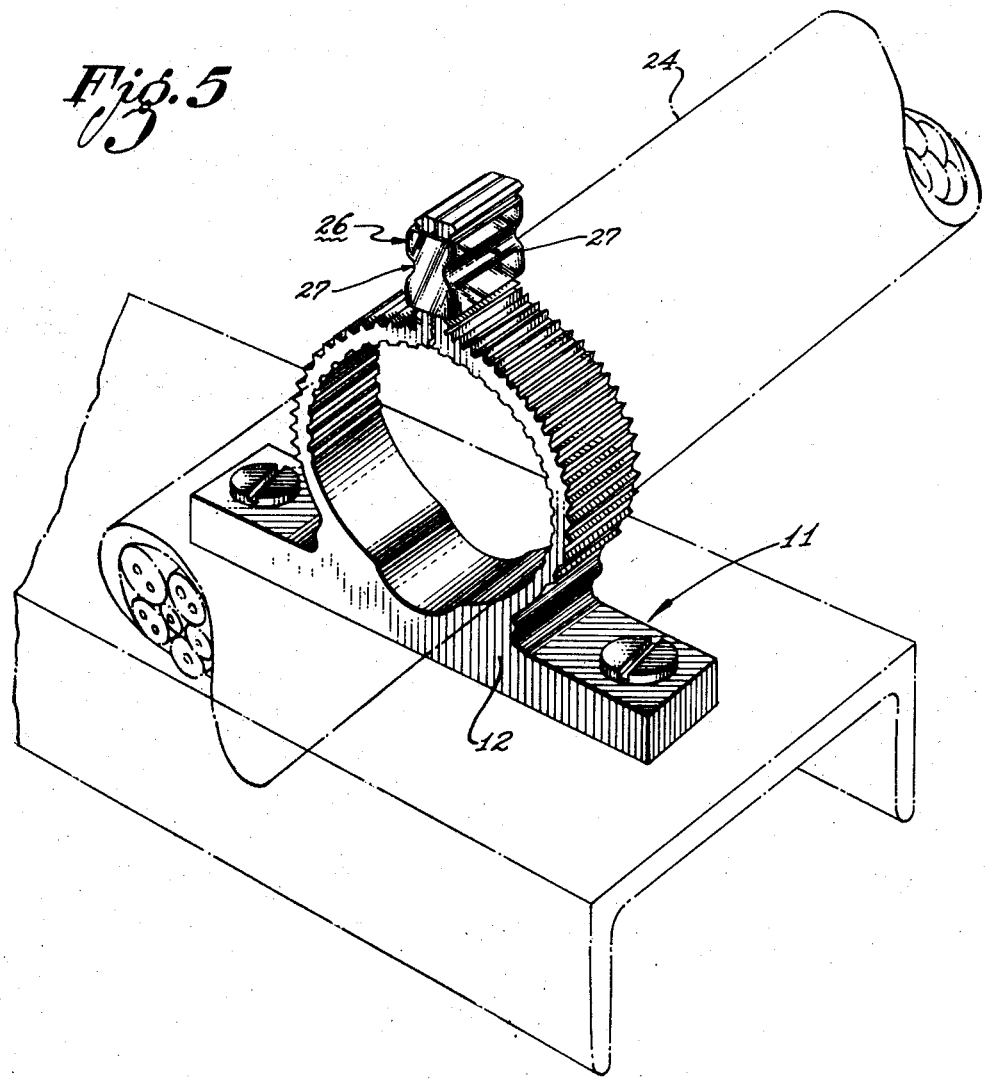

Both side surfaces of the arms 14 are provided with serrations or corrugations 17 which extend crosswise thereof throughout the major portions of their length as best seen in Figures 2 and 3. These corrugations not only function to better secure items embraced between the arms 14 but also cooperate with various types of retaining means as shown in Figures 4–6 to secure the installations as a whole. The clamping device 11 is secured to supporting structure by means of screws, bolts, rivets or the like, as shown in Figures 4–6, which pass through apertures 18 provided in the base portion 12 at locations outboard with respect to the arms 14.

The operation and utility of the clamping device 11 may best be understood by referring to Figures 4–6. In Figure 4 a single electrical cable 19 including a plurality of individual wires (not shown) is positioned and retained between the arms 14 by means of a clip or buckle member 21. In this instance it will be noted that the diameter of the cable 19 and the distance between the arms 14 is substantially the same. Accordingly the cable is snugly buttoned on the arcuate surface provided between the arms 14 and secured therein by the clip 21. The clip 21 consists of a rectangular frame 22 having a pair of cross members 23 extending between the sides of the frame and in spaced relation with respect to themselves and with respect to the ends of the frame. Accordingly it will be seen that the arms 14 can be threaded through the various openings provided in the clip 21, substantially as shown in Figure 4, to effectively secure the cable 19 in the device 11. It will also be noted that the corrugations 17 cooperate with the ends and cross members 23 of the clip 22 to maintain the cable 19 in its secured position although the installation may be subject to considerable and severe vibrations.

The installation as shown in Figure 5 is similar to that shown in Figure 4 except that a cable 24, having a diameter exceeding that of the cable 19 of Figure 4 is shown, and a different type of retainer means is utilized. In this embodiment it will be noted that it is necessary to deform the arms 14 slightly to accommodate the cable 24. This, however, is easily done as the arms 14 have a high degree of fllexibility and are able to contour themselves to receive cables and the like of various sizes. In this embodiment a sleeve 26 constructed of metal or other suitable material surrounds the arms 14 and is properly secured thereon. This latter operation is accomplished by squeezing the clip 26 with a pair of pliers or the like to indent the clip as indicated at 27. The indentations 27 cooperate with the corrugations 17 to secure the sleeve 26 firmly in place until such time as it is forceably removed.

In the embodiment shown in Figure 6 a pair of fluid conduits 28—28 are shown in juxtaposed relation embraced by the device 11. In this embodiment the arms 14 are brought together so that they snugly secure the conduits 28 in the device 11 and are secured in this position by means of a lacing cord 29 which constitutes metal wire or the like. Because of the corrugations 17 the chances that the cord 29 will slip off the arms 12 is minimized.

As previously mentioned the clamping device 11 constitutes a lengthwise portion of an extrusion or the like and is fabricated from nylon, Teflon, plastic or the like. Accordingly a length as required by a particular installation may be cut from the extrusion. In other words, if a larger area of support is required for a particular installation a longer portion is cut from the extrusion which then constitutes the clamping device 11. Also, irrespective of the type of retainer used to secure members in the device 11, the excess of the arms 14 can be easily removed by conventional scissors, a diagonal cutter, or the like. Thus a minimum of space is occupied by the device 11 as excess portions thereof which are not utilized are removed.

It would only be necessary to stock a few sizes of the flexible clamping device 11 as disclosed herein to accommodate a wide range of installations. On the other hand a great many different sizes of circumferential type clamps which are now in common usage would be required to accommodate the same range and type of installations. Also, clamping devices as disclosed herein will effectively secure and support electrical cables, fluid conduits, and the like and yet will permit a limited sliding action therein to relieve excessive tension and the like.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. A clamp assembly adapted to maintain a plurality of conduits or the like in a predetermined arrangement and to secure said conduits to suitable structure comprising: integrally formed means including a base portion and a pair of arms; said pair of arms constitute flexible strap-like members which extend from said base portion in spaced and parallel relation and have crosswise corrugations formed on each side surface of said pair of arms; said base portion also constitutes a strap-like means having major side surfaces which extend in a direction normal to the lengthwise extent of said pair of arms and portions of said base portion define at least one aperture whereby said integral means may be secured to suitable structure; and retainer means adapted to provide a connection between said pair of strap-like members at a position spaced from said base portion and which cooperates with said corrugations in effecting said connection.

2. In a clamp assembly a clamping unit adapted to receive a plurality of conduits or the like comprising: integrally formed means including a base portion and a pair of arms; said pair of arms each constitute flexible strap-like members which extend from said base portion in spaced and parallel relation and have crosswise corrugations formed on each side surface thereof; said base portion is also of strap-like configuration which is thicker than said arms and has side surfaces which extend in a direction normal to the lengthwise extent of said arms, and portions of said base portion define at least one aperture whereby said integral means may be secured to suitable structure.

3. A clamp assembly as set forth in claim 3: further characterized in that said retainer means constitutes a rectangular frame including side members, end members and a pair of cross members, the latter members being spaced from each other and from said end members and extend between said side members at positions intermediate said end members.

References Cited in the file of this patent

UNITED STATES PATENTS

| | | |
|---|---|---|
| 593,978 | Boehm | Nov. 23, 1897 |
| 622,739 | Wahlert | Apr. 11, 1899 |
| 1,085,421 | Hiller | Jan. 27, 1914 |
| 2,004,695 | Hager | June 11, 1935 |
| 2,292,140 | Lofgren | Aug. 4, 1942 |
| 2,580,231 | Lamm | Dec. 25, 1951 |

FOREIGN PATENTS

| | | |
|---|---|---|
| 486,849 | Italy | Nov. 18, 1953 |
| 508,037 | Italy | Jan. 4, 1955 |
| 839,585 | Germany | May 23, 1952 |